US012693201B2

(12) United States Patent     (10) Patent No.:   US 12,693,201 B2

Dalley     (45) Date of Patent:    Jul. 28, 2026

(54) METHODS FOR DETERMINING THE AMOUNT OF INSOLUBLE MATERIAL IN A SAMPLE, AND APPARATUSES FOR THE SAME

(71) Applicant: Aaron Dalley, Gunnison, UT (US)

(72) Inventor: Aaron Dalley, Gunnison, UT (US)

( * ) Notice: Subject to any disclaimer, the term of this patent is extended or adjusted under 35 U.S.C. 154(b) by 374 days.

(21) Appl. No.: 18/501,337

(22) Filed: Nov. 3, 2023

(65) Prior Publication Data

US 2024/0151625 A1     May 9, 2024

Related U.S. Application Data

(60) Provisional application No. 63/382,655, filed on Nov. 7, 2022.

(51) Int. Cl.
| | |
|---|---|
| *G01N 15/04* | (2006.01) |
| *G01N 1/38* | (2006.01) |
| *G01N 1/40* | (2006.01) |
| G01N 15/06 | (2006.01) |

(52) U.S. Cl.
CPC .............. *G01N 15/04* (2013.01); *G01N 1/38* (2013.01); *G01N 1/4022* (2013.01); *G01N 2001/4027* (2013.01); *G01N 2015/0687* (2013.01)

(58) Field of Classification Search
None
See application file for complete search history.

(56) References Cited

U.S. PATENT DOCUMENTS

| | | | | |
|---|---|---|---|---|
| 4,753,889 | A | * | 6/1988 | Collins .................... G01N 5/04 |
| | | | | 422/74 |
| 9,927,414 | B2 | * | 3/2018 | Plank ..................... G01N 3/165 |
| 2004/0168529 | A1 | * | 9/2004 | Carlson .................. C40B 40/04 |
| | | | | 436/178 |
| 2023/0032946 | A1 | * | 2/2023 | Schiering .............. B01F 21/221 |

FOREIGN PATENT DOCUMENTS

| | | | | | |
|---|---|---|---|---|---|
| WO | WO-2008136002 A2 | * | 11/2008 | ............... | G01N 5/00 |
| WO | WO-2009105359 A1 | * | 8/2009 | ............... | C01D 3/04 |

* cited by examiner

*Primary Examiner* — Daniel S Larkin
(74) *Attorney, Agent, or Firm* — SNELL & WILMER L.L.P.

(57) ABSTRACT

Methods and systems for determining the amount of insoluble material in a sample are provided. A sample is split into a plurality of aliquots, which are processed. By obtaining the weight of the dry aliquot, a first and second container, and dry insoluble material, the percentage of insoluble material in the original sample may be determined.

9 Claims, 8 Drawing Sheets

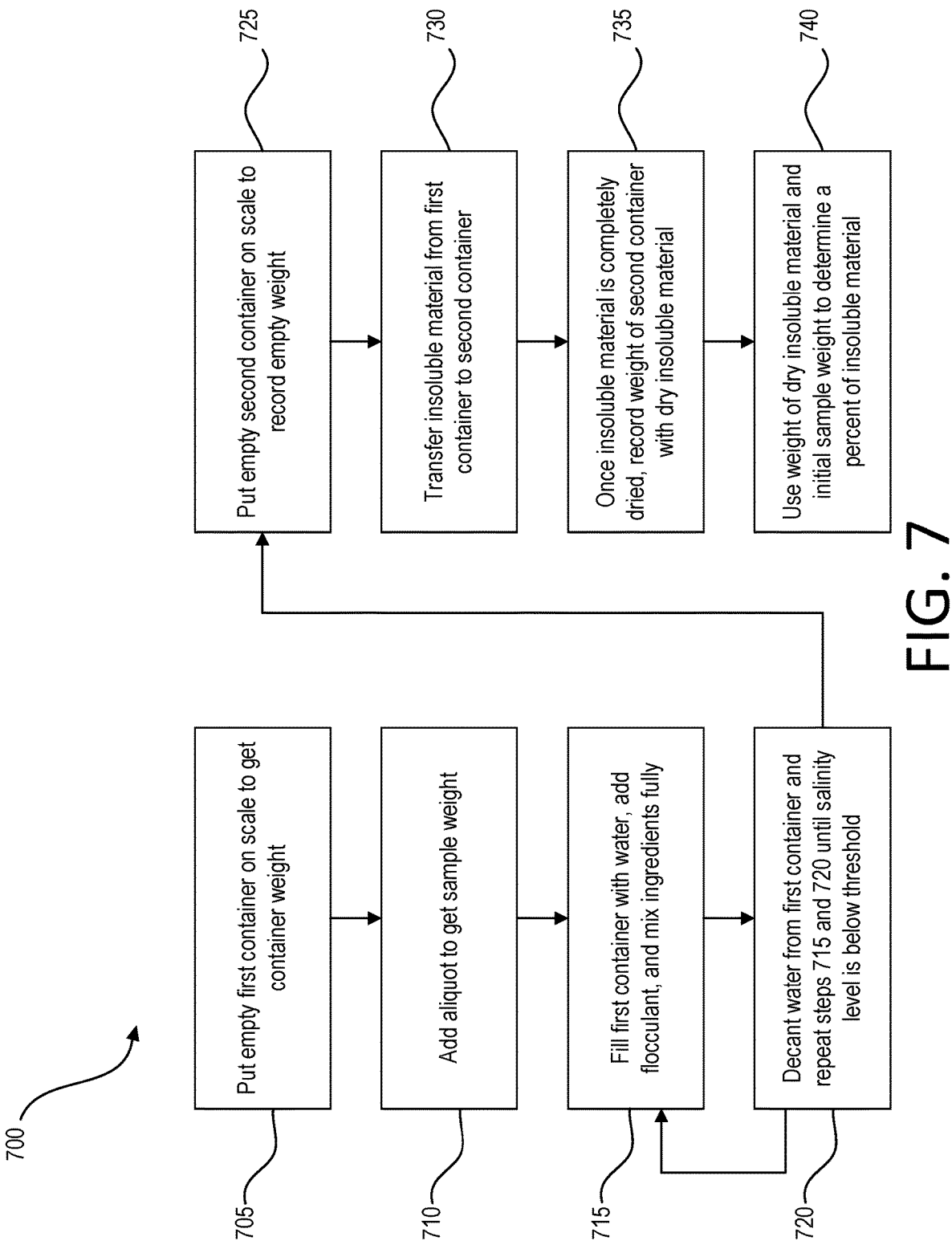

705 — Put empty first container on scale to get container weight

710 — Add aliquot to get sample weight

715 — Fill first container with water, add flocculant, and mix ingredients fully 720 — Decant water from first container and repeat steps 715 and 720 until salinity level is below threshold 725 — Put empty second container on scale to record empty weight 730 — Transfer insoluble material from first container to second container 735 — Once insoluble material is completely dried, record weight of second container with dry insoluble material 740 — Use weight of dry insoluble material and initial sample weight to determine a percent of insoluble material

METHODS FOR DETERMINING THE AMOUNT OF INSOLUBLE MATERIAL IN A SAMPLE, AND APPARATUSES FOR THE SAME

CROSS-REFERENCE TO RELATED APPLICATION

This application claims priority to, and the benefit of, U.S. Provisional Patent Application Ser. No. 63/382,655 entitled "METHODS FOR DETERMINING THE AMOUNT OF INSOLUBLE MATERIAL IN A SAMPLE, AND APPARATUSES FOR THE SAME" filed on Nov. 7, 2022. The foregoing application is hereby incorporated by reference in its entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to determining the amount of insoluble material in a sample, and in particular to determining the amount of insoluble material in a salt sample.

BACKGROUND

In certain applications, salt may not be sold without, or the purchaser may request, information about the level of impurities in a salt sample. In other applications, selling salt without such a determination may violate a law or regulation, such as an environmental regulation. Conventionally, testing of salt samples is available through laboratories. These laboratory conducted tests require expensive equipment and are limited on the size of sample that can be processed. In addition, the time required to process a sample of salt may be high, causing a bottleneck and delaying the purchase and sale of salt. Accordingly, an improved method of determining the amount of insoluble material in a sample is disclosed herein. Apparatuses for performing the method are also disclosed.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

FIG. 7 shows a flowchart with steps to determine the amount of insoluble material in a sample, in accordance with various exemplary embodiments.

DETAILED DESCRIPTION

Figure 1:
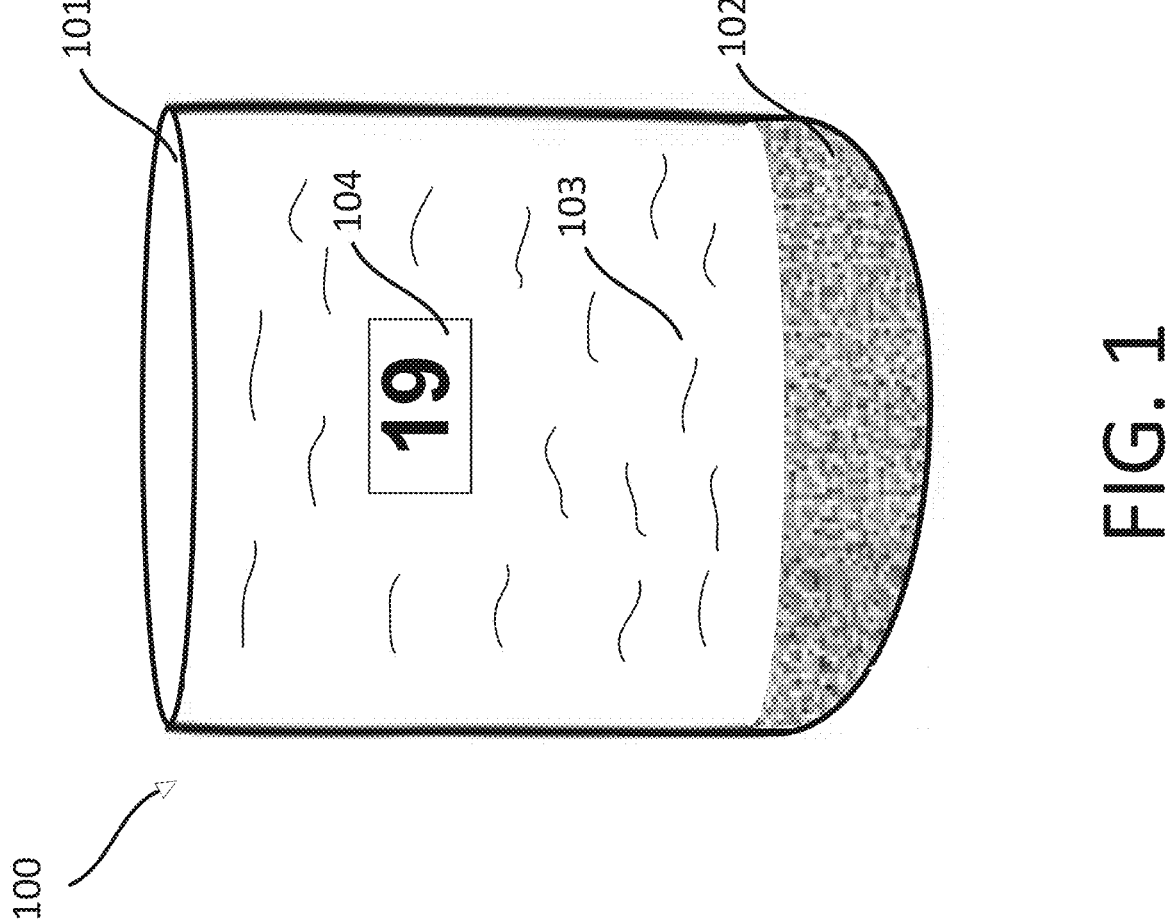
FIG. 1 shows a first container apparatus for determining the amount of insoluble material in a sample, in accordance with various exemplary embodiments.

The detailed description of exemplary embodiments herein makes reference to the accompanying drawings, which show exemplary embodiments by way of illustration. While these exemplary embodiments are described in sufficient detail to enable those skilled in the art to practice the principles of the present disclosure, it should be understood that other embodiments may be realized and that logical changes and adaptations in design and construction may be made in accordance with principles of the present disclosure. Thus, the detailed description herein is presented for purposes of illustration only and not of limitation. For example, steps recited in any of the method or process descriptions may be executed in any suitable order and are not necessarily limited to the order presented. Furthermore, any reference to singular includes plural embodiments, and any reference to more than one component or step may include a singular component or step.

The connecting lines shown in various figures contained herein are intended to represent exemplary functional relationships and/or physical couplings between various elements. It should be noted that many alternative or additional functional relationships or physical connections may be present in a practical method for determining the amount of insoluble material in a sample, related methods, related systems, and/or products arising therefrom.

In various embodiments, a method of determining the amount of insoluble material in a sample may include using a riffle splitter to split the sample into a plurality of aliquots. In other embodiments the sample could be made into aliquots by using material screens. In various embodiments, each aliquot of the sample may include a weight between about 25 grams and about 100 grams. However, larger sample weights could be used if a larger container is also used. The method may include using a first container. Examples of the first container may include using a watertight container, for example, a mason jar. Another example of the method may include using an opened top container, for example, a beaker. The first container may include a seal to ensure contents do not spill if rotation is used to mix aliquot and water. The first container may include any suitable volume to ensure proper separation of insoluble material and water. In a typical method example, the first container has a volume of about one quart.

The method may include placing a first aliquot of the sample into the first container. The method may include filling the first container with distilled water. The water may include clean potable water or distilled water. The method may include adding a flocculant to the sample in the first container. In one example of the method, the flocculant could be added to the combined mixture by using a pipette. In other examples of the method, the flocculant could be added using a measuring spoon. The method may include mixing the contents of the first container by rotating and inverting a water-tight container with a sealed lid in place. In other embodiments, the contents of the first container could be mixed by using a magnetic stirrer and stirring bar.

The method may include separating the contents of the first container into a solid portion and a liquid portion by allowing the insoluble material to settle at the bottom of the first container. After the liquid portion of the contents of the first container is transparent, the method may include decanting some of the liquid portion of the contents of the first container. In one example of the embodiment, the liquid could be decanted by using a vacuum pump or siphon. In other examples of the embodiment, the liquid could be decanted by using a pipette. The method may include repeating the operations of mixing the contents, separating the contents into a solid portion and a liquid portion, and decanting some of the liquid portion of the contents until the liquid portion of the contents of the first container has a salt content below an acceptable level. In a typical example of the method, a salinity meter could be used to verify that salt content is below an acceptable level.

In various embodiments, the mixing of the contents of the first container may cause the dissolution of the aliquot. The contents of the first container may be separated by allowing the first container to sit until all insoluble material has settled. In various embodiments, a salinity measurement device may be used to determine the salt content of the liquid portion of the content of the first container. In various embodiments, the operations of mixing the contents, separating the contents into a solid portion and a liquid portion, and decanting some of the liquid portion of the contents until the liquid portion of the contents of the first container has a salt content below an acceptable level may be repeated at least three times.

In various embodiments, the method may further include transferring the contents of the first container into a second container. In an example embodiment, the second container may include a cooking tin. In other embodiments, the second container could be a glass beaker. In various embodiments, the method may further include evaporating the contents of the second container. The evaporating process could be sped up by evaporating the contents of the second container using an oven. In other example embodiments the evaporating process could be sped up by using a hot plate.

In various embodiments, the method may further include recording an empty weight of the first container. After placing the aliquot of the sample into the first container, the method may further include recording a combined weight of the first container and aliquot. The method may further include recording an empty weight of the second container. After transferring the contents to the second container and evaporating the contents of the second container, the method may include recording a dry weight of the second container with its remaining contents.

In various embodiments, the method may further include determining the amount of insoluble material in the sample by using the empty weight of the first container, the combined first container and aliquot weight of the first container, the empty weight of the second container, and the dry weight of the second container with its remaining contents.

In various embodiments, an apparatus for determining the amount of insoluble material in a sample may include a riffle splitter to separate the sample into a plurality of aliquots. An apparatus may include a first container to hold an aliquot. An apparatus may include an agitation device to mix aliquot and water to create a combination mixture. An apparatus may include a decanting device to remove water from the combination mixture after insoluble material settles at the bottom of first container. An apparatus may include a second container to receive transfer of remaining insoluble material. An apparatus may include an evaporation device to further remove remaining liquid from second container.

In various embodiments, the first container may include a sealed lid to allow first container to be inverted without the loss of any of the combination mixture. The riffle splitter, or other separating device, may split the sample into a plurality of aliquots. Each aliquot may include a weight of between about 25 grams and about 100 grams. In other example embodiments the weight of each aliquot could be above 100 grams if the volume of the container was such that insoluble material and water would have proper separation. Typically, the first container may include a volume of about one quart. In various embodiments, the agitation device may be configured to accept the first container. The agitation device may include a stirring rod. Other example embodiments may include a manual agitation device. In various embodiments, the apparatus may include a salinity measurement device to measure salt content of the liquid in the first container. In various embodiments, the second container may include a cooking tin or any heat-resistant container. In other embodiments the second container could be a glass beaker. The evaporation device may include an oven. In various embodiments, the apparatus may further include a weight measurement device.

Referring now to FIG. 1, FIG. 1 illustrates an exemplary embodiment of an apparatus for determining the amount of insoluble material in a sample 100. In the illustration, a first container 101 can be seen. The first container 101 could be a home grade water-tight container, such as a glass jar. The first container 101 could also be a beaker. The first container 101 typically has a volume of around one quart, but larger or smaller containers could also be used as long as first container 101 will allow proper separation of liquids and solids. The first container is shown with the contents of the first container separated into an insoluble portion 102 and a liquid portion 103. Affixed to the outside of the first container is a label 104 to help distinguish one first container 101 from other first containers 101.

Figure 2:
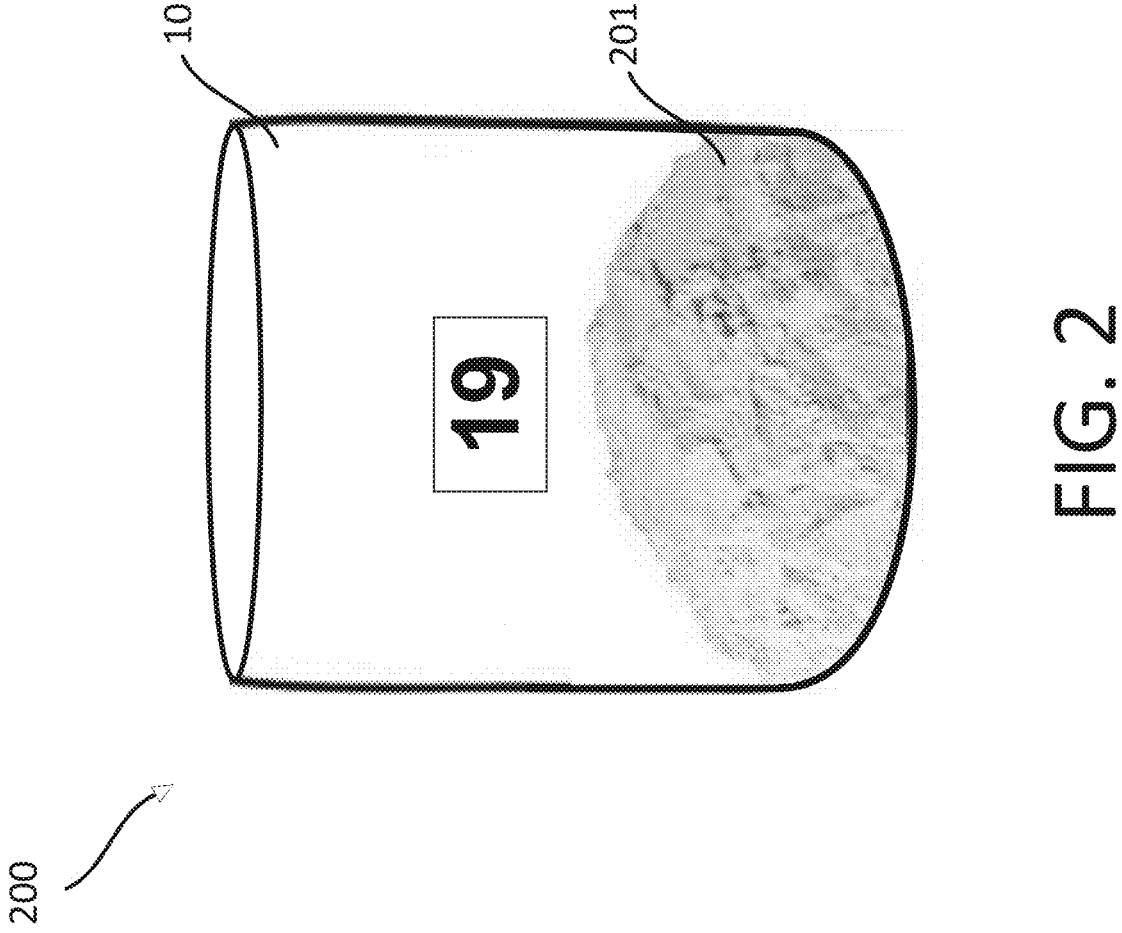
FIG. 2 shows a first container and within the first container is a dry sample aliquot, in accordance with various exemplary embodiments.

Referring now to FIG. 2, FIG. 2 illustrates an exemplary embodiment of an apparatus 200. In the illustration is a first container 101. Deposited in the first container 101 is a sample aliquot 201. The sample aliquot 201 is typically 25 grams to 100 grams in weight, but the weight could be greater as long as the volume of the first container 101 is large enough to properly decant the clear liquid from the first container 101. Dry samples that have a higher salt content upon visual inspection may utilize a larger sample to be tested.

Figure 3:
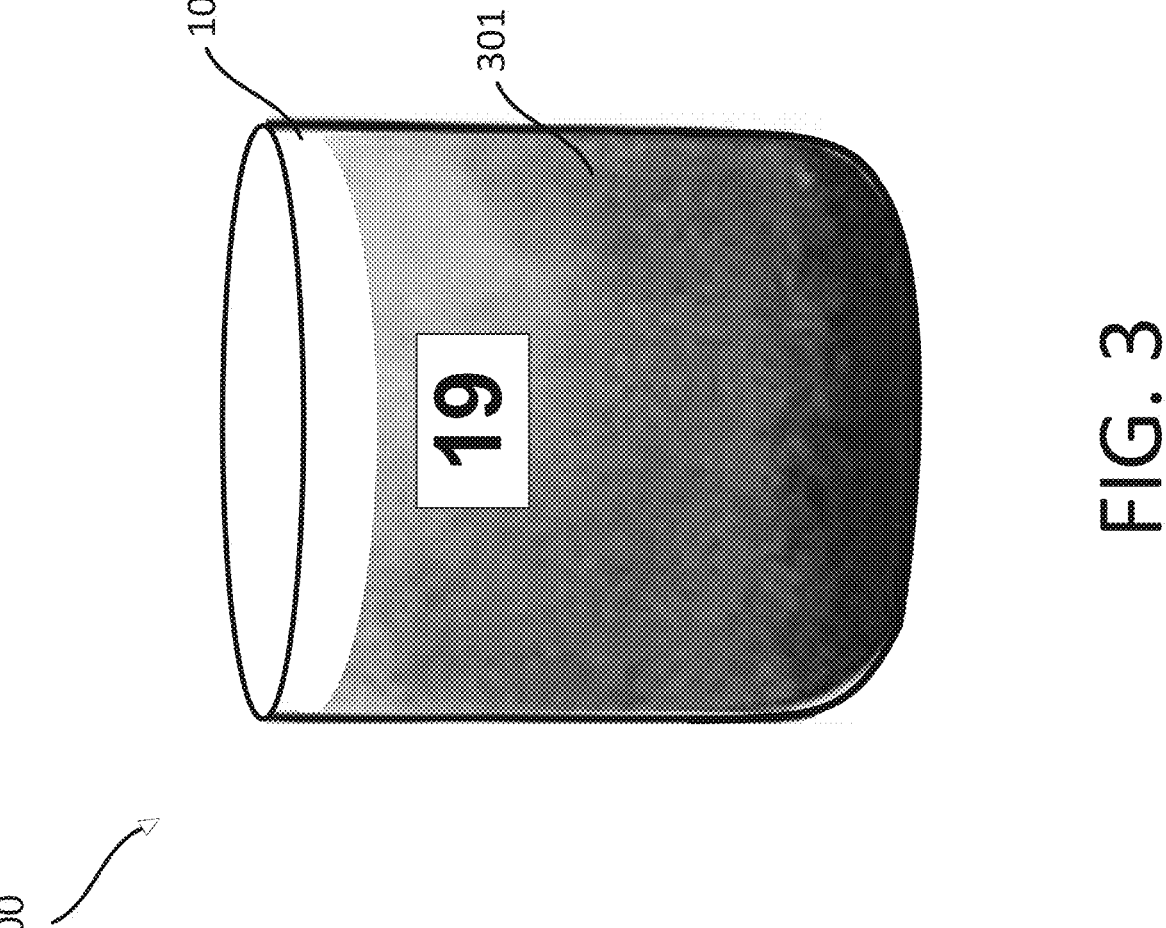
FIG. 3 shows a first container and within the first container is a combined mixture of the sample aliquot and distilled water, in accordance with various exemplary embodiments.

Referring now to FIG. 3, FIG. 3 illustrates an exemplary embodiment of an apparatus 300. In the illustration, a first container 101 is shown with a combined mixture 301 of water and the dissolved aliquot. Mixing of the combined mixture could be achieved by rotation of the first container 101 or by using a magnetic base with stirring rod. If using a water-tight container, mixing of the combined mixture could be achieved by inverting and rotating the first container 101 until the sample and liquid have been properly mixed.

Figure 4:
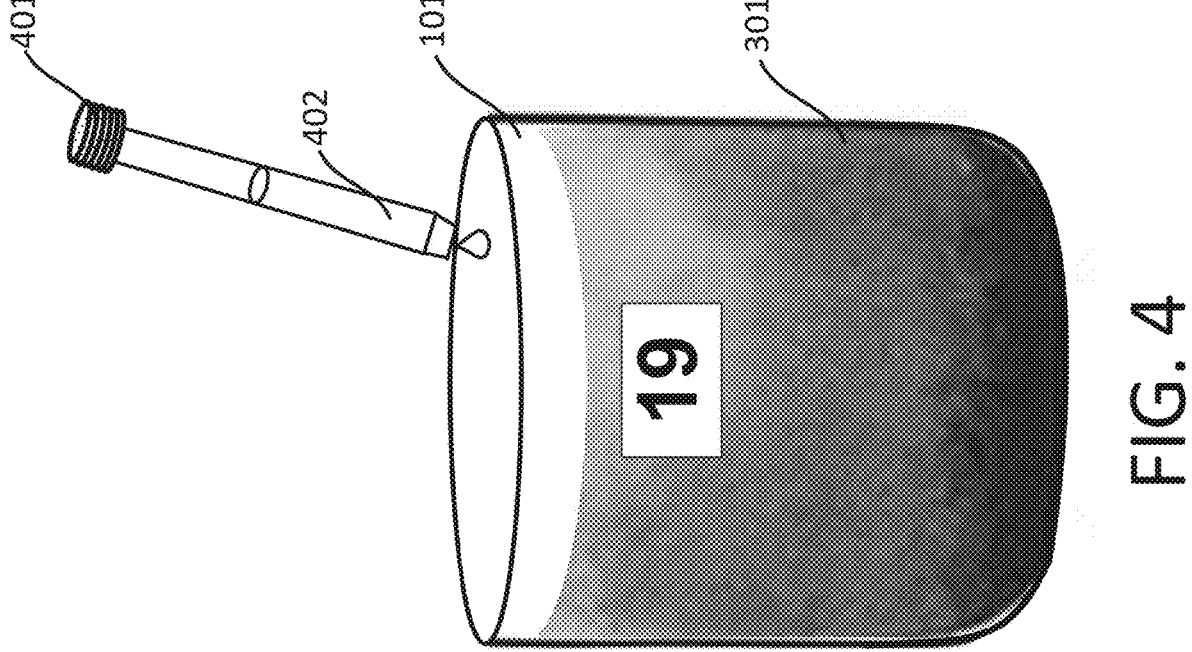
FIG. 4 shows a first container and within the first container is the combined mixture and a flocculant in a dispenser ready to be added to the combined mixture, in accordance with various exemplary embodiments.

Referring now to FIG. 4, FIG. 4 illustrates an exemplary embodiment of an apparatus. In the illustration, a first container 101 with combined mixture 301 is shown with a pipette 401 containing flocculant 402 ready to be dispensed to help settle the solids in the combined mixture 301. In other example embodiments, the flocculant 402 could be added using a measuring spoon or other suitable device.

Figure 5:
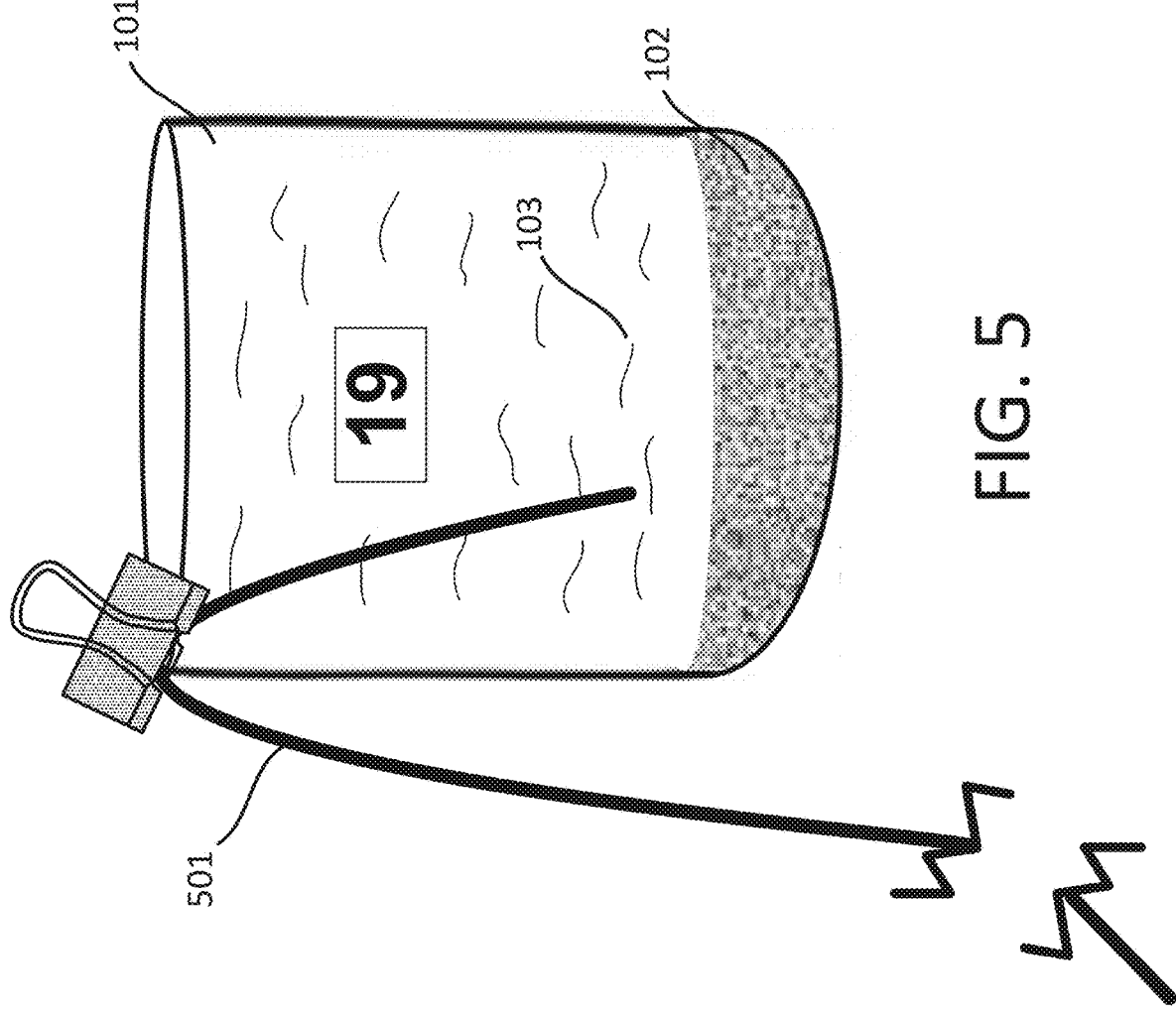
FIG. 5 shows a first container, and within the first container is a settled mixture of the sample aliquot and distilled water. Additionally, inserted in the top of the first container is a decanting device, in accordance with various exemplary embodiments.

Referring now to FIG. 5, FIG. 5 illustrates an exemplary embodiment of an apparatus. Shown is a first container 101 with liquid portion 103 separated from the insoluble portion 102. Inserted in the top of the first container 101 is a decanting device 501 to remove liquid portion 103 after liquid portion 103 has become separated from the insoluble portion 102. This exemplary embodiment is showing a decanting device 501 that could be under vacuum. The liquid portion 103 could also be decanted using a pipette. In any method used to decant the liquid portion 103, it is desirable that the user only decant the liquid portion 103 and avoid accidental decanting the insoluble portion 102.

Figure 6:
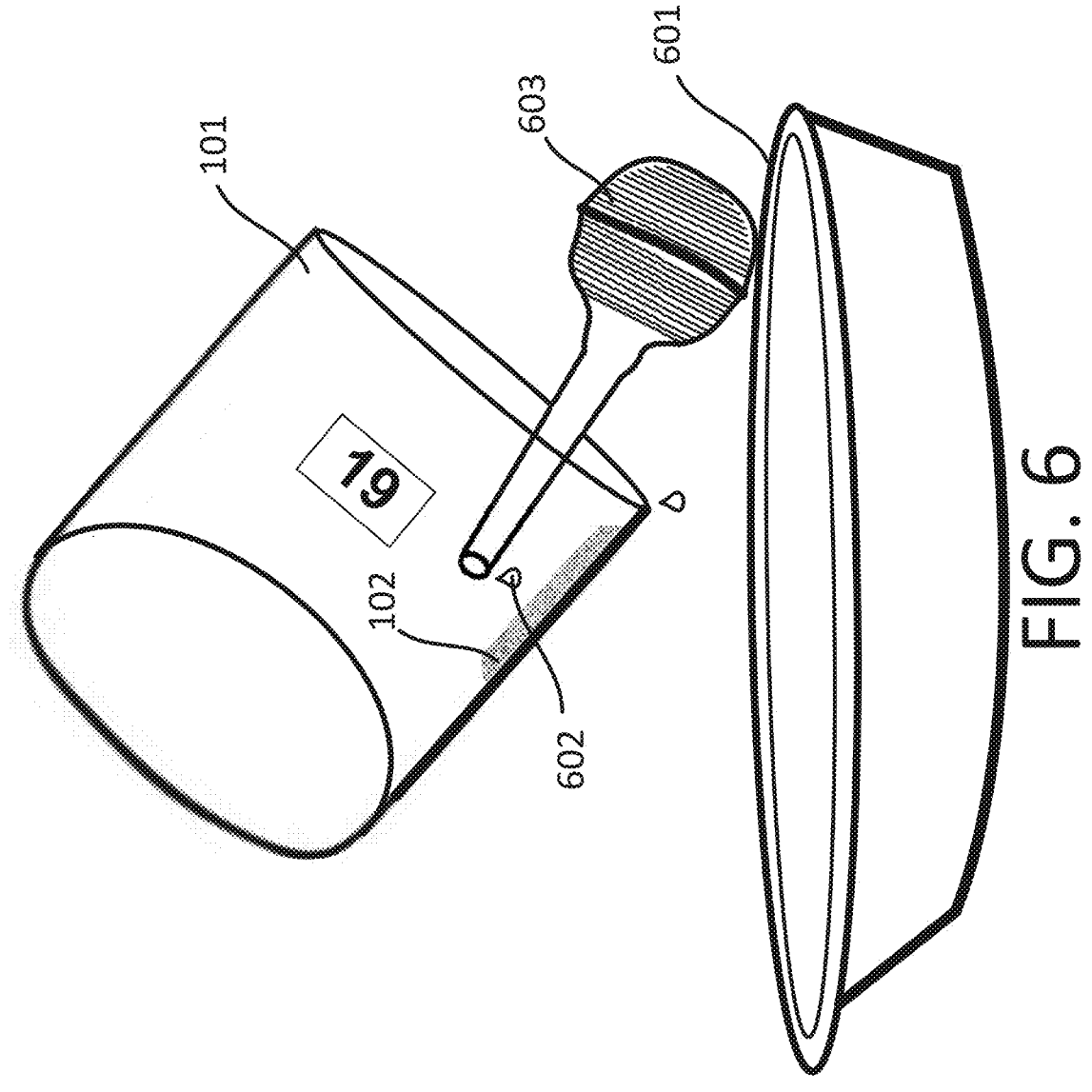
FIG. 6 shows a user emptying the excess insoluble material from the first container into the second container while using a pipette to ensure sufficient transfer, in accordance with various exemplary embodiments.

Referring now to FIG. 6, FIG. 6 illustrates an exemplary embodiment of an apparatus. In the illustration, a user is emptying the insoluble portion 102 from the first container 101 into the second container 601. To aid in the removal of the insoluble portion 102 from the first container 101, the user is applying some distilled water 602 with a pipette 603. This application of distilled water 602 helps to loosen the insoluble portion 102 from the sides of the first container 101 so that full transfer from first container 101 to second container 601 can be achieved.

Referring now to FIG. 7, FIG. 7 illustrates a flowchart of an exemplary embodiment of a method for determining the amount of insoluble material in a sample. Method 700 may first include putting an empty first container on a scale to get the empty weight of the first container (operation 705). A first aliquot may be placed in the first container and a weight for the aliquot is then recorded (operation 710). Fill the first container with water, add flocculant, and mix ingredients fully until water, sample, and flocculant are combined (operation 715). Decant the excess water from first container, making sure to avoid decanting insoluble material, and repeat steps 715 and 720 until the salinity level is below a threshold (operation 720). Put an empty second container on a scale to record the empty second container weight (operation 725). Transfer all insoluble material from the first container to the second container (operation 730). Once insoluble material is completely dried, record the weight of the second container with dry insoluble material (operation 735). Use the weight of dry insoluble material and initial sample weight to determine a percent of insoluble material (operation 740).

Figure 8:
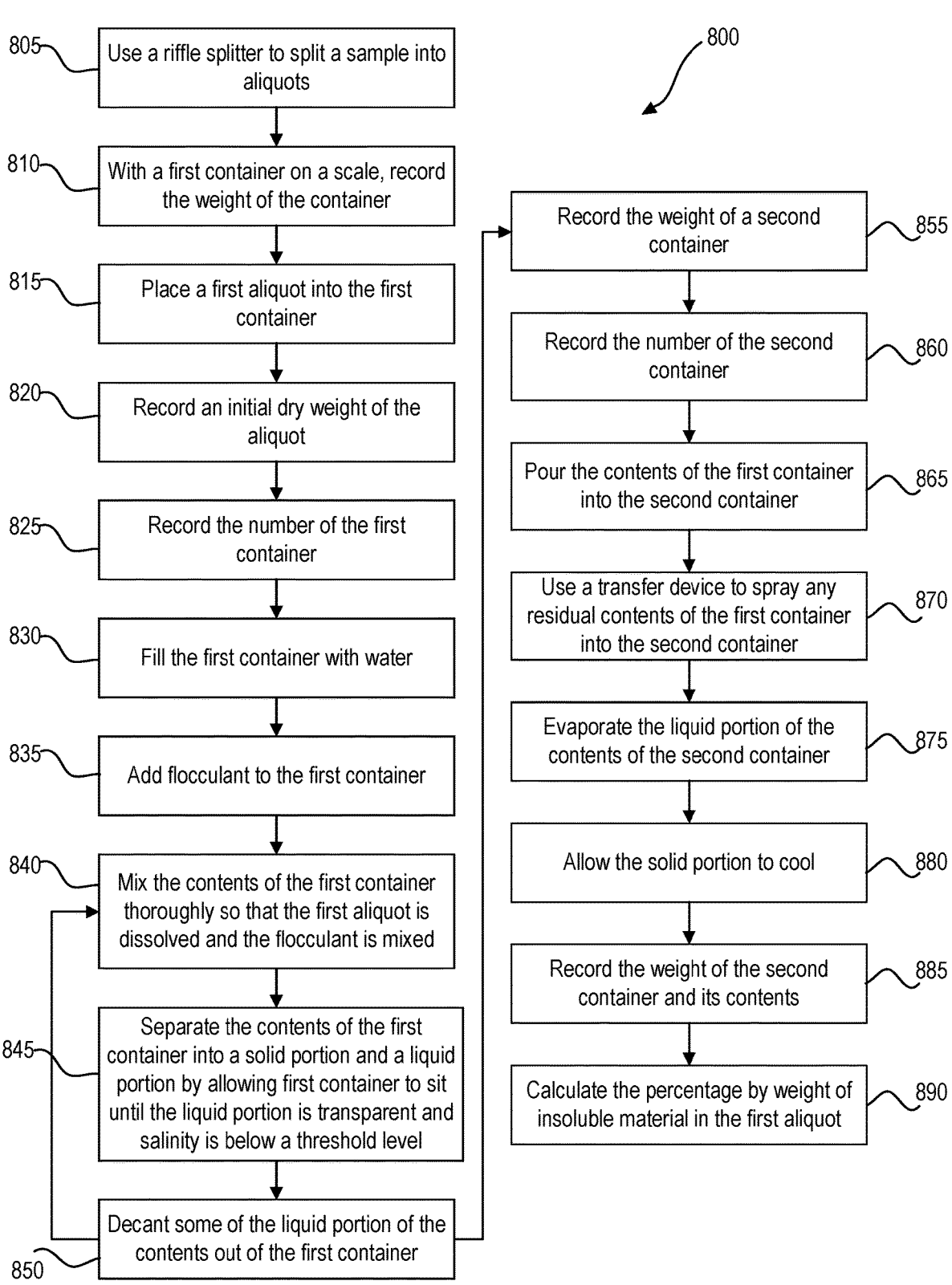
FIG. 8 shows a flowchart with steps to determine the amount of insoluble material in a sample, in accordance with various exemplary embodiments.

Referring now to FIG. 8, FIG. 8 illustrates a flowchart of an exemplary embodiment of a method for determining the amount of insoluble material in a sample. Method 800 may first include using a riffle splitter to split a sample into aliquots (operation 805). A first container may be placed on a scale to record the weight of the first container (operation 810). A first aliquot of the sample may be placed into the first container (operation 815). An initial dry weight of the aliquot may then be recorded (operation 820). A number of the first container may be recorded to distinguish one first container from another first container (operation 825). The first container may then be filled with distilled water (operation 830). A flocculant may be added to the first container to allow settling of the solids suspended in the liquid (operation 835). The contents of the first container may then be mixed thoroughly so that the first aliquot is dissolved, and the flocculant is mixed (operation 840). The contents of the first container may be separated into a solid portion and a liquid portion by allowing the first container to sit until the liquid portion is transparent (operation 845). Some of the liquid portion of the contents may be decanted out of the first container (operation 850). Operations 840, 845, and 850 may then be repeated multiple times, as desired.

A weight of a second container may then be recorded using a scale (operation 855). An identifier of the second container may also be recorded (operation 860). The identifier of the second container may distinguish the first container from other similar or identical second containers. The contents of the first container may be poured into the second container (operation 865). A transfer device, like a transfer pipette, may be used to spray any residual contents of the water-tight container into the second container (operation 870). The liquid portion of the contents of the second container may then be evaporated (operation 875). The solid portion may be allowed to cool (operation 880). A weight of the second container and its contents (the solid portion) may then be recorded (operation 885). The percentage by weight of insoluble material in the first aliquot may then be calculated using dry weight from the second container and the initial sample weight of aliquot (operation 890).

While the principles of this disclosure have been shown in various exemplary embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure and may be expressed in the following claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of any embodiment. In the claims, reference to an element in the singular is not intended to mean "one and only one" unless explicitly so stated, but rather "one or more."

Moreover, when language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

Systems, methods and apparatus are provided herein. In the detailed description herein, references to "various exemplary embodiments", "one embodiment", "an embodiment", "an exemplary embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of processing a sample, the method comprising:

(a) using a riffle splitter to split the sample into a plurality of aliquots;

(b) placing a first aliquot of the sample into a first container;

(c) filling the first container with water to create a combination mixture;

(d) adding a flocculant to the combination mixture in the first container;

(e) stirring the contents of the first container;

(f) separating the contents of the first container into a solid portion and a liquid portion;

(g) decanting some of the liquid portion of the contents of the first container after the liquid portion of the contents of the first container are transparent; and (h) repeating operations (f) through (g) until the liquid portion of the contents of the first container has a salt content below a threshold level.

2. The method of claim 1, wherein each aliquot of the sample comprises a weight between 25 grams and 100 grams.

3. The method of claim 2, wherein the mixing of the contents of the first container causes the dissolution of the first aliquot.

4. The method of claim 3, wherein the contents of the first container are separated by allowing the container to sit.

5. The method of claim 4, wherein a salinity meter is used to determine the salt content of the liquid portion of the contents of the first container.

6. The method of claim 1, the method further comprising transferring the contents of the first container to a second container.

7. The method of claim 6, wherein the contents of the second container are dried using an evaporation device.

8. The method of claim 7, further comprising:

(i) recording an empty weight of the first container;

(j) recording a dry weight of the first container after recording a weight of the first aliquot after placing the first aliquot of the sample into the first container;

(k) recording an empty weight of the second container; and (l) recording a dry weight of the second container with its remaining contents after evaporating the contents of the second container.

9. The method of claim 8, further comprising:

(m) determining the amount of insoluble material in the sample, using the empty weight of the first container, the dry weight of the first container, the empty weight of the second container, and the dry weight of the second container with its remaining contents.

\* \* \* \* \*